Jan. 16, 1934.　　　G. WOLKENHAUER　　　1,944,050

MEANS AND METHOD FOR DISPLAYING SUBSTANCES

Filed March 15, 1932

Gustav Wolkenhauer
INVENTOR

BY Victor J. Evans & Co.
HIS ATTORNEYS

WITNESS.

Patented Jan. 16, 1934

1,944,050

UNITED STATES PATENT OFFICE 1,944,050

MEANS AND METHOD FOR DISPLAYING SUBSTANCES

Gustav Wolkenhauer, Chicago, Ill., assignor, by mesne assignments, to Visual Display, Inc., Chicago, Ill., a corporation of Delaware Application March 15, 1932. Serial No. 599,010

7 Claims. (Cl. 206—82)

This invention relates to certain novel improvements in means and method for displaying substances.

Heretofore in displaying substances such as, for example, fruits and vegetables, it has been customary to place the substance in a container, perhaps in a solution of its own juice, if it be an edible, and then to arrange a closure member over the open end of the container. This method is objectionable and ineffectively displays the substance for a number of reasons: I have found that, for example, when an edible is thus displayed in a liquid such as its own juice air bubbles or pockets are formed in the juice in the container. These air bubbles or pockets not only cause the edible or other displayed substance to decay but they also so affect the light rays passing therethrough that the liquid or juice appears cloudy and the true and natural shade or color of the displayed substance is beclouded or obscured and is not seen by an observer looking through the container, whereby the effectiveness and attractiveness of the natural color of the displayed article or substance are largely diminished or entirely destroyed for all display purposes. This method of displaying a substance or article causes the substance to gravitate toward the bottom of the container so that the observer sees only the liquid in which the substance is disposed. Among the objects of this invention, therefore, are to overcome the foregoing and other difficulties experienced in methods heretofore employed for displaying substances in transparent containers, and to provide new and improved means and a new and improved method for displaying various substances, such as, for example, edibles in a transparent container; to prevent the formation of air bubbles or pockets in the medium in which the edible or other substance is displayed; to effectively hold the substance in a fixed position in the medium in which it is displayed; to bring out and preserve for display purposes the true natural color or shade and appearance of an edible or other substance displayed in a transparent container.

Another object of the invention is to provide new and improved means for mounting a container for display purposes.

Other objects will appear hereinafter.

The invention consists in the novel combination and arrangement of parts to be hereinafter described and claimed.

The invention will be best understood by reference to the accompanying drawing, showing the preferred form of construction and in which.

Figure 1:
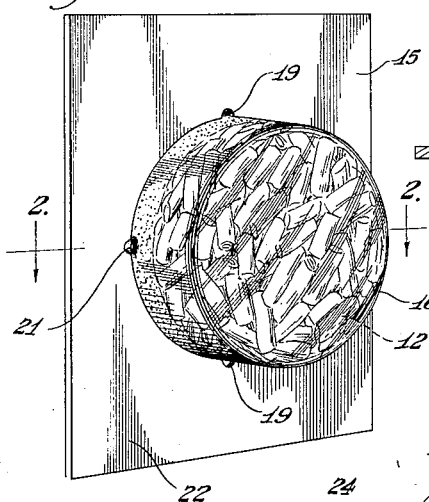
Fig. 1 is a perspective view of a transparent container containing a substance displayed according to my method.
Figure 2:
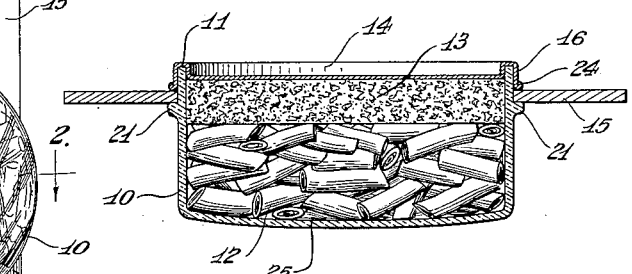
Fig. 2 is a sectional view on line 2—2 in Fig. 1.

In the drawing 10 indicates a transparent display container or jar having an open end 11. In practising my invention I place a transparent jelly-like substance or colloidal gel 25 of gelatin or the like and I suspend in this medium 25 the edible 12 or other substance to be displayed which may be, for example, a fruit or vegetable. Heretofore it has been customary to arrange the substance to be displayed, as for example, the edible 12 in a liquid in a transparent container and then to arrange over the open end of the container a closure member. This method of displaying a substance such as an edible in the container causes air entrapped in the container and in the liquid medium in which the substance is disposed to form air bubbles or pockets between and around the displayed articles. These air bubbles or pockets not only cause the displayed substance to decay but they likewise so affect the light rays that the liquid in which the displayed substance is immersed is rendered cloudy and the true natural color or shade of the displayed article or substance is obscured. The attractiveness of the natural shade or color of the displayed article or substance is, therefore, greatly diminished or entirely destroyed for all display purposes.

In practising my invention I overcome the foregoing and other difficulties of the prior art by arranging the displayed article or substance, such as edible 12, in a clear, transparent jelly-like substance or colloidal gel 25 which holds the displayed article or substance 12 in a fixed position in the container. A jelly-like seal or background 13 is then placed in the container and pressed firmly against the gel 25. This seal 13 may be made of a colloidal gel such as gelatin. The formation of air pockets or bubbles and consequent decay of the displayed substance or edible 12 in the container are thereby prevented. Moreover, the gel 25 in the container does not become cloudy due to air bubbles or pockets. The gel 25 likewise holds the displayed substance or articles 12 in a fixed position in the container. The natural shade or color of the displayed article or substance 12 is made clearly visible through the container and the attractiveness and appeal that the true natural shade or color of the displayed article or substance has for display purposes is thus preserved.

When displaying edibles such as, for example, fruits and vegetables a solution of the juice of the edible may be mixed with the gelatin or the like before the same sets to form the gel or jelly-like seal 13 which then also acts as a background for the edible and the gel 25 in the container and so affects the light rays that the true natural color or shade of the edible is more effectively brought out than has been done heretofore. The gel or jelly-like seal 13 may also be colored or tinted various shades, by using any suitable coloring materials, to provide a contrasting background against the natural shade or color of the displayed substance or edible 12. This seal 13 may be made of any substance that is capable of being intimately mixed with the juice of the edible and peptized to form a colloidal gel or jelly-like substance, such as, for example, gelatin.

Figure 4:
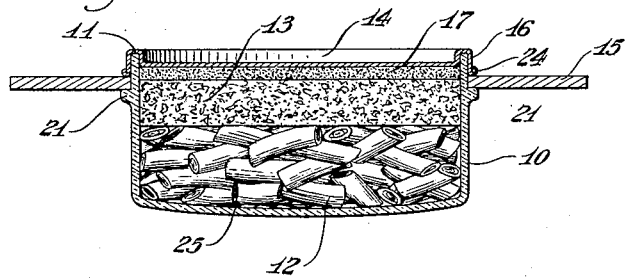
Fig. 4 is a sectional view similar to Fig. 2 but illustrating a modification of the invention.

To prevent air and moisture from attacking and drying out and shrinking the gel 25 and the gel seal or background 13 and to facilitate mounting the container on a suitable support, such as 15, I arrange over the open end 11 of the container 10 a suitable closure member 14 which has a peripheral flange 16 that is frictionally fitted about the open end of the container 10. However, if the container 10 is not to be mounted on a support such as 15, I may dispense entirely with the closure member 14 and I then provide outwardly of the gel or background 13 a secondary seal 17 (Fig. 4) which may be made of any suitable substance such as, for example, paraffin or the like. This secondary seal 17 effectively prevents air from attacking and drying out and shrinking the gel seal 13 and the gel 25. In the event, however, that it is desired to mount the container 10, having both the gel 13 and the secondary seal 17, on a support such as 15 I may arrange the closure member 14 over the open end 11 of the container whereupon the container may be mounted in the support 15 in a manner presently to be described.

Figure 3:
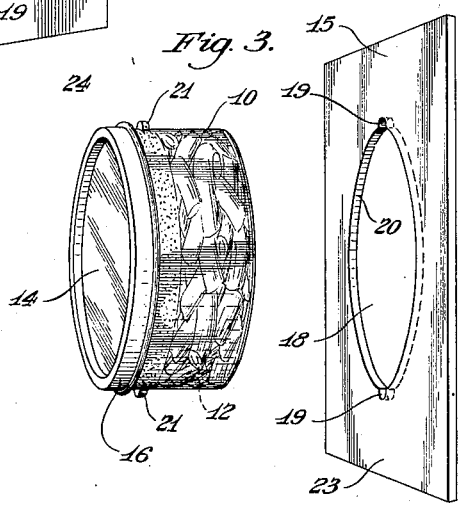
Fig. 3 is a perspective view of the container and mounting detached.

Provided in the support 15 is an opening 18 and the marginal edge 20 of this opening is provided with notches 19. Provided on the container 10 are projecting elements or lugs 21. In mounting the container 10 upon the support 15 the container 10 is inserted (from its position of Fig. 3 toward the support 15) into the opening 18 from the rear side 23 of the support 15, the projecting elements or lugs 21 being registered with and passed through the notches 19 to the front side 22 of the support 15 whereupon the container 10 is rotated to move the projecting elements 21 out of registration with notches 19. The flange 16 of the closure member 14 and a bead 24 on said flange then cooperate with the projecting elements or lugs 21 to latch the container upon the support 15.

While the displayed substance 12 shown is an edible substance any other substance or article may be displayed in the gel 25 that is capable of being suspended in said gel 25.

While I have illustrated and described the preferred method for carrying my invention into effect, this is capable of variation and modification without departing from the spirit of the invention. I, therefore, do not wish to be limited to the precise details set forth, but desire to avail myself of such variations and modifications as come within the scope of the appended claims.

Having thus described my invention, what I claim as new and desire to protect by Letters Patent is:

1. An article for display comprising the combination of a transparent container, a transparent gel in the container having suspended therein a substance to be displayed, and a layer of jelly-like substance arranged over said gel and providing a reflector body for said substance whereby the true natural color of said substance is made visible to the eye of an observer when viewed through said container and gel.

2. An article for display comprising the combination of a transparent container, a transparent gel in the container having suspended therein a substance to be displayed, and a background layer of jelly-like substance arranged over said gel providing a reflector body for said edible substance and being of a color substantially in contrast with the color of said edible substance.

3. A display package comprising the combination of a transparent container, a transparent gel in the container having suspended therein a solid edible substance to be displayed, and a light-reflective background for said gel and substance consisting of a layer of jelly-like substance arranged in the container over said gel and having intimately mixed therewith the natural juice of said edible substance whereby the true color or shade of said edible substance is made visible to the eye of an observer when viewed through said container and gel.

4. A device for displaying samples of a commodity, comprising a relatively shallow transparent container, a transparent gel in the container, samples of the commodity arranged in the gel, said gel substantially filling that portion of the container occupied by the samples, and being of such consistency as to maintain the samples in fixed relation and so that they may be viewed in perspective.

5. A device for displaying a sample of a commodity, comprising a container, a transparent medium in the container, a sample of the commodity arranged in the medium, said medium substantially filling that portion of the container occupied by the sample and being of such consistency as to maintain the sample in fixed position and so that it may be viewed in perspective, and said sample being clearly visible through the medium and the container.

6. A device for displaying a sample of a commodity, comprising a container, a transparent medium in the container, a sample of the commodity arranged in the medium, said medium substantially filling at least that portion of the container occupied by the sample and being of such consistency as to maintain the sample in fixed position and so that it is clearly visible in perspective through the medium and the container, and means for excluding air from the medium and the sample.

7. A device for displaying commodities, comprising a container, a plurality of samples of the commodity arranged in the container, a transparent medium filling the interstices of the sample and substantially filling at least that portion of the container occupied by the sample, said medium being of such consistency as to maintain the samples in fixed relation and so that they may be viewed in perspective, and said samples being clearly visible through the medium and the container.

GUSTAV WOLKENHAUER.